Patented Sept. 12, 1950

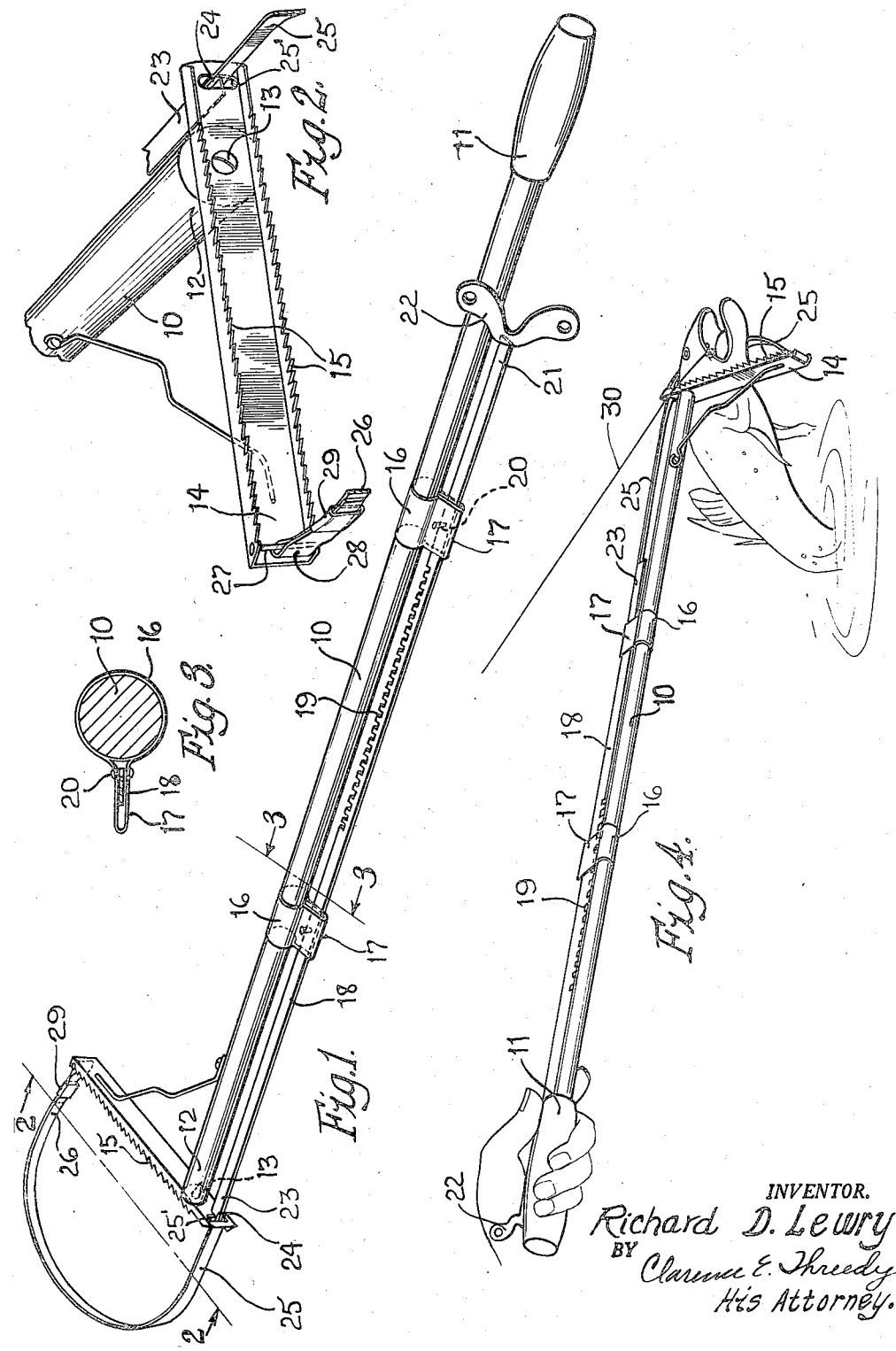

2,522,454

UNITED STATES PATENT OFFICE 2,522,454

FISH HANDLING AND LANDING DEVICE

Richard D. Lewry, Chicago, Ill., assignor of one-half to Thaddeus J. Morawski, Chicago, Ill.

Application June 14, 1948, Serial No. 32,879

1 Claim. (Cl. 294—19)

This invention relates to certain new and useful improvements in fish handling and landing devices and has for its principal object the provision of an improved construction of this character which will be highly efficient in use and economical in manufacture.

The device constituting my invention is especially useful for landing fish caught by trolling or during still fishing.

An object of the invention is to provide a device of this character by which the head of a fish may be trapped and firmly held during the landing operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the invention;

Fig. 2 is a sectional detail view taken substantially on line 2—2 of Fig. 1;

Fig. 3 is a sectional detail view taken substantially on line 3—3 of Fig. 1; and Fig. 4 is a perspective view of the same showing the device in operation.

The several objects of my invention are accomplished by the preferred form of construction illustrated in the accompanying drawings.

In these drawings my invention is illustrated as comprising an elongated rod 10 providing at one end a handle 11 by means of which the rod may be manipulated and firmly held in the hand. The end 12 of the rod is connected as at 13 to an elongated clamping bar 14 extending at right angles with respect to the rod 10.

The opposite longitudinal edge portions of this bar 14 are bent inwardly in parallel relation with respect to each other. These inturned edge portions are serrated to provide teeth 15.

Mounted on the rod 10 are sleeves 16 providing guide plates 17 through which an operating rod 18 is adapted for slidable movement in the direction of its length. This rod 18 provides a plurality of notches 19 adapted to engage the pin 20 of one of the sleeves 16 for releasably latching the rod 18 in adjusted position with respect to the rod 10.

The end portion 21 of the rod 18 provides a handle 22 which may be firmly grasped by the hand for moving the rod 18 longitudinally of the rod 10.

The end portion 23 of the rod 18 has secured thereto as at 24, by welding or the like, one end portion of a flexible clamping wire or band 25. This wire is adapted to be drawn through an opening 25' formed in the adjacent end portion of the bar 14. The opposite end portion 26 of this wire 25 is turned back upon itself to provide a loop 28 for detachable connection to a pin 27 carried by the bar 14. The end portions 26 providing this loop 28 are removably connected together by a sliding sleeve 29.

In use, such for example, during trolling or still fishing, the fish line 30 after the lure or bait has been fixed to the fish hook of the line is passed through the loop provided by the wire 25 and the clamping bar 14 for free movement longitudinally through this loop. The loop is adjusted longitudinally of the line 30 to a position where the wire 25 will encircle the head of the fish at which time the rod 18 is moved longitudinally of the rod 10 to draw the wire loop 25 tightly about the head of the fish and to clamp the fish head between the wire 25 and the clamping plate 14 in which position the fish will be firmly held during the landing and handling operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A fish handling and landing device comprising an elongated handle-bearing rod, guide members carried by the rod in spaced aligned relation with respect to each other, an elongated tooth-bearing plate having one end portion connected to the rod portion opposite the handle thereof and extending substantially at right angles with respect to the rod, said plate having an opening in said end portion adjacent said rod, a flexible wire having one end connected to the other end of the plate remotely from the rod, said wire being movable through said opening with the opposite end portion of said wire disposed in parallel relation with respect to the rod and slidably movable through the guide members, a handle on said opposite end portion of said wire, said opposite end portion of said wire having a plurality of notches formed therein, and a pin member carried by one of said guide members and adapted for selectively latched engagement with said notches to releasably latch said wire in adjusted position with respect to the rod, substantially as described.

RICHARD D. LEWRY.

REFERENCES CITED

The following references are of record in the file of this patent:

UNITED STATES PATENTS

| Number | Name | Date |
|---|---|---|
| 602,818 | Ball | Apr. 26, 1898 |
| 613,788 | Youngquist | Nov. 8, 1898 |
| 1,120,735 | Moyer | Dec. 15, 1914 |
| 1,164,528 | Knapp | Dec. 14, 1915 |
| 1,413,139 | Smith | Apr. 18, 1922 |